(12) United States Patent
Jho et al.

(10) Patent No.: US 12,425,187 B2
(45) Date of Patent: Sep. 23, 2025

(54) STATEFUL ORDER-PRESERVING ENCRYPTION METHOD AND APPARATUS FOR ENHANCING SECURITY

(71) Applicant: ELECTRONICS AND TELECOMMUNICATIONS RESEARCH INSTITUTE, Daejeon (KR)

(72) Inventors: Nam-Su Jho, Daejeon (KR); Ju-Young Kim, Daejeon (KR); Sung-Jin Yu, Daejeon (KR); Young-Kyung Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 120 days.

(21) Appl. No.: 18/413,214

(22) Filed: Jan. 16, 2024

(65) Prior Publication Data

US 2024/0322995 A1  Sep. 26, 2024

(30) Foreign Application Priority Data

Mar. 21, 2023  (KR) .................. 10-2023-0036737

(51) Int. Cl.
*H04L 9/06*  (2006.01)
(52) U.S. Cl.
CPC .................. *H04L 9/0618* (2013.01)
(58) Field of Classification Search
CPC ..... H04L 9/0618; H04L 2209/08; H04L 9/12; H04L 9/06
See application file for complete search history.

(56) References Cited

U.S. PATENT DOCUMENTS

| 8,817,978 | B2 | 8/2014 | Jho et al. | |
|---|---|---|---|---|
| 2015/0172044 | A1* | 6/2015 | Teranishi | ............... G06F 21/60 380/28 |
| 2019/0394180 | A1 | 12/2019 | Spahn et al. | |

FOREIGN PATENT DOCUMENTS

| EP | 3151461 A1 | 4/2017 |
|---|---|---|
| KR | 10-2012-0070874 A | 7/2012 |
| KR | 10-2017-0103321 A | 9/2017 |

OTHER PUBLICATIONS

Alexandra Boldyreva et al., "Order-Preserving Symmetric Encryption", IACR Cryptology ePrint Archive, Apr. 16, 2009.
Raluca Ada Popa et al., "An Ideal-Security Protocol for Order-Preserving Encoding", 2013 IEEE Symposium on Security and Privacy, May 2013.
Florian Kerschbaum, "Frequency-Hiding Order-Preserving Encryption", Proceedings of the 22nd ACM SIGSAC Conference on Computer and Communications Security, Oct. 12, 2015.

* cited by examiner

*Primary Examiner* — Quazi Farooqui
(74) *Attorney, Agent, or Firm* — LRK PATENT LAW FIRM

(57) ABSTRACT

Disclosed herein is a method and apparatus for stateful order-preserving encryption for enhancing security. The method includes generating an order-preserving ciphertext by performing order-preserving encryption on a plaintext, generating a plurality of dummy ciphertexts corresponding to a preset variable for the order-preserving ciphertext, and adding the order-preserving ciphertext and the plurality of dummy ciphertexts to a ciphertext set.

14 Claims, 5 Drawing Sheets

STATEFUL ORDER-PRESERVING ENCRYPTION METHOD AND APPARATUS FOR ENHANCING SECURITY

CROSS REFERENCE TO RELATED APPLICATION

This application claims the benefit of Korean Patent Application No. 10-2023-0036737, filed Mar. 21, 2023, which is hereby incorporated by reference in its entirety into this application.

BACKGROUND OF THE INVENTION

1. Technical Field

The present disclosure relates generally to stateful order-preserving encryption technology for enhancing security, and more particularly to technology for enabling an efficient search in the state in which data including a user's desired keyword is encrypted while protecting data privacy through encryption.

2. Description of Related Art

Databases (DBs) are being used in various ways in order to collect, manage, and efficiently use large amounts of data. In the event of leakage of collected data from a database, side effects, such as exposure of information about multiple users, and the like, occur, so technology for protecting data, such as access control, is applied to the database.

However, because administrators of databases are able to access data stored in the databases at any time, when data is entrusted to a database managed by a third party, issues related to data security and privacy protection may arise. In order to fundamentally protect data entrusted to a database, encryption is applied to data before the data is stored, but there is a disadvantage in which a query operation of a general database cannot be used in principle for the data to which encryption is applied.

For this reason, development and application of multiple searchable encryption techniques have been attempted in order to efficiently search for data desired by a user in the state in which data is encrypted. An order-preserving encryption technique is an encryption method that preserves the order information (numerical order) of plaintexts in ciphertexts when the plaintexts are encrypted, so it is evaluated as a technique that enables multiple search queries to be efficiently used through ciphertexts stored in a database. However, the order-preserving encryption technique has the disadvantage of not providing high security for ciphertexts due to its fundamental characteristic in which the order information of plaintexts is maintained in ciphertexts, and it is difficult to directly apply the currently known order-preserving encryption technique to databases.

DOCUMENTS OF RELATED ART (Patent Document 1) Korean Patent Application Publication No. 10-2017-0103321, published on Sep. 13, 2017 and titled "Order-preserving encryption method and apparatus with enhanced security".

SUMMARY OF THE INVENTION

An object of the present disclosure is to provide order-preserving encryption technology having enhanced security by preventing an attacker from inferring a plaintext set from the statistical characteristics of a ciphertext set.

Another object of the present disclosure is to enhance security of order-preserving encryption technology by making it impossible for an attacker to distinguish between a ciphertext for an actual plaintext and an arbitrarily generated ciphertext in a ciphertext set even when the attacker infers a plaintext set.

In order to accomplish the above objects, a method for order-preserving encryption according to the present disclosure includes generating an order-preserving ciphertext by performing order-preserving encryption on a plaintext, generating a plurality of dummy ciphertexts corresponding to a preset variable for the order-preserving ciphertext, and adding the order-preserving ciphertext and the plurality of dummy ciphertexts to a ciphertext set.

Here, the ciphertext set may include a plurality of ciphertext subsets, and a state information variable indicating state information may be assigned to each of the plurality of ciphertext subsets.

Here, the initial value of the state information variable may be set to 0, and the value of the state information variable may be increased by 1 each time a ciphertext is added to the ciphertext subset to which the state information variable is assigned.

Here, generating the plurality of dummy ciphertexts may include selecting an arbitrary ciphertext from a ciphertext subset, the state information variable of which has a smallest value, among the plurality of ciphertext subsets, generating a single dummy ciphertext by adding a ciphertext check bit generated in a manner different from the order-preserving encryption to the arbitrary ciphertext, and repeatedly performing the process of generating a single dummy ciphertext a number of times corresponding to the preset variable.

Here, the method may further include setting a data search range based on a data search condition, extracting at least one candidate ciphertext corresponding to the data search range from the plurality of ciphertext subsets, and providing search data by removing a dummy ciphertext from the at least one candidate ciphertext.

Here, the data search range may be set based on values that are output by performing order-preserving encryption on an upper limit value and a lower limit value included in the data search condition.

Here, a ciphertext check bit may be calculated for each of the at least one candidate ciphertext, and a candidate ciphertext, the ciphertext check bit of which does not match a ciphertext check bit corresponding to the order-preserving encryption, among the at least one candidate ciphertext, may be identified as the dummy ciphertext.

Also, an apparatus for order-preserving encryption according to an embodiment of the present disclosure includes a processor for generating an order-preserving ciphertext by performing order-preserving encryption on a plaintext, generating a plurality of dummy ciphertexts corresponding to a preset variable for the order-preserving ciphertext, and adding the order-preserving ciphertext and the plurality of dummy ciphertexts to a ciphertext set; and memory for storing the ciphertext set.

Here, the ciphertext set may include a plurality of ciphertext subsets, and a state information variable indicating state information may be assigned to each of the plurality of ciphertext subsets.

Here, the initial value of the state information variable may be set to 0, and the value of the state information variable may be increased by 1 each time a ciphertext is added to the ciphertext subset to which the state information variable is assigned.

Here, the processor may select an arbitrary ciphertext from a ciphertext subset, the state information variable of which has a smallest value, among the plurality of ciphertext subsets, generate a single dummy ciphertext by adding a ciphertext check bit generated in a manner different from the order-preserving encryption to the arbitrary ciphertext, and repeatedly perform the process of generating a single dummy ciphertext a number of times corresponding to the preset variable.

Here, the processor may set a data search range based on a data search condition, extract at least one candidate ciphertext corresponding to the data search range from the plurality of ciphertext subsets, and provide search data by removing a dummy ciphertext from the at least one candidate ciphertext.

Here, the data search range may be set based on values that are output by performing order-preserving encryption on an upper limit value and a lower limit value included in the data search condition.

Here, a ciphertext check bit may be calculated for each of the at least one candidate ciphertext, and a candidate ciphertext, the ciphertext check bit of which does not match a ciphertext check bit corresponding to the order-preserving encryption, among the at least one candidate ciphertext, may be identified as the dummy ciphertext.

BRIEF DESCRIPTION OF THE DRAWINGS

The above and other objects, features, and advantages of the present disclosure will be more clearly understood from the following detailed description taken in conjunction with the accompanying drawings, in which.

DESCRIPTION OF THE PREFERRED EMBODIMENTS

Figure 1:
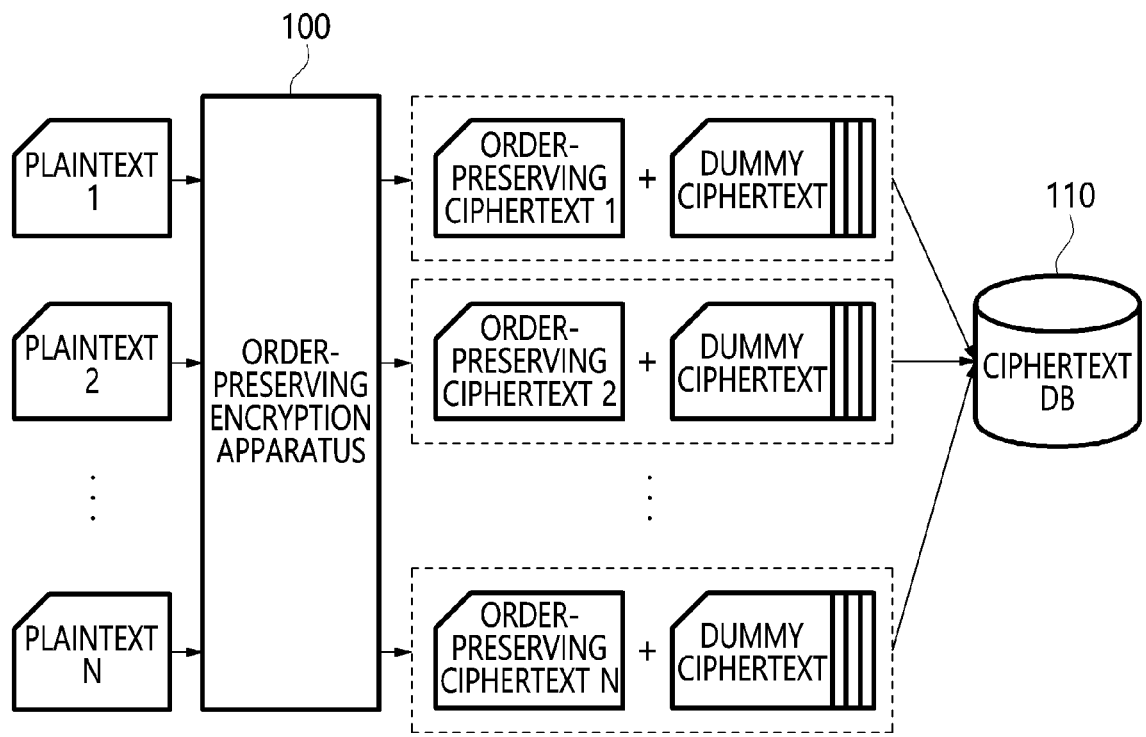
FIG. 1 is a view illustrating a system for order-preserving encryption according to an embodiment of the present disclosure.

The present disclosure will be described in detail below with reference to the accompanying drawings. Repeated descriptions and descriptions of known functions and configurations which have been deemed to unnecessarily obscure the gist of the present disclosure will be omitted below. The embodiments of the present disclosure are intended to fully describe the present disclosure to a person having ordinary knowledge in the art to which the present disclosure pertains. Accordingly, the shapes, sizes, etc. of components in the drawings may be exaggerated in order to make the description clearer.

In the present specification, each of expressions such as "A or B", "at least one of A and B", "at least one of A or B", "A, B, or C", "at least one of A, B, and C", and "at least one of A, B, or C" may include any one of the items listed in the expression or all possible combinations thereof.

Hereinafter, a preferred embodiment of the present disclosure will be described in detail with reference to the accompanying drawings.

An object of the present disclosure is to provide a method for enhancing security of order-preserving encryption technology, which provides lower security than general encryption technology.

In the case of an order-preserving encryption function, the order information of a plaintext is exposed to everyone through a ciphertext itself. Accordingly, there is a disadvantage in which, when an attacker knows the statistical characteristics of a plaintext set, it is likely that the attacker is able to infer a plaintext from a given ciphertext set when the ciphertext set has a sufficiently large size.

For this reason, security enhancement is required for order-preserving technology in order to make it impossible for an attacker to infer a plaintext set in a statistical manner. For example, a method of encrypting the same plaintext into different ciphertexts in order to hide statistical information may be applied.

However, when an attacker knows which plaintext corresponds to a ciphertext in a target ciphertext set, the attacker is able to infer a plaintext from order information itself even though statistical information is hidden.

In the present disclosure to be described below, a method for including dummy data in a ciphertext set is proposed in order to overcome the fundamental disadvantage of order-preserving encryption technology. Through this method, a user may configure a ciphertext set having a statistical characteristic desired by the user for any plaintext set, whereby an attacker may be prevented from inferring the plaintext set.

Also, because the attacker cannot identify the ciphertext acquired by encrypting the actual plaintext in a given ciphertext set, there is an advantage in which the attacker cannot efficiently reconstruct the plaintext from the ciphertext despite having information about the plaintext set.

FIG. 1 is a view illustrating a system for order-preserving encryption according to an embodiment of the present disclosure.

Referring to FIG. 1, the system for order-preserving encryption according to an embodiment of the present disclosure includes an order-preserving encryption apparatus 100 and a ciphertext DB 110.

The order-preserving encryption apparatus 100 generates an order-preserving ciphertext by performing order-preserving encryption on a plaintext.

Also, the order-preserving encryption apparatus 100 generates a plurality of dummy ciphertexts corresponding to a preset variable for the order-preserving ciphertext.

Also, the order-preserving encryption apparatus 100 adds the order-preserving ciphertext and the plurality of dummy ciphertexts to a ciphertext set managed in the ciphertext DB 110.

Here, the ciphertext set includes a plurality of ciphertext subsets, and a state information variable indicating state information may be assigned to each of the plurality of ciphertext subsets.

Here, the initial value of the state information variable may be set to 0, and the value of the state information variable may be increased by 1 each time a ciphertext is added to the ciphertext subset to which the state information variable is assigned.

Here, an arbitrary ciphertext may be selected from the ciphertext subset, the state information variable of which has the smallest value, among the plurality of ciphertext subsets, a single dummy ciphertext may be generated by adding a ciphertext check bit generated in a manner different from order-preserving encryption to the selected arbitrary ciphertext, and the process of generating a single dummy ciphertext may be repeatedly performed a number of times corresponding to the preset variable.

Also, the order-preserving encryption apparatus 100 sets a data search range based on a data search condition, extracts at least one candidate ciphertext corresponding to the data search range from the plurality of ciphertext subsets, and provides search data by removing a dummy ciphertext from the at least one candidate ciphertext.

Here, the data search range may be set based on values that are output by performing order-preserving encryption on the upper limit value and the lower limit value included in the data search condition.

Here, an encryption check bit is calculated for each of the at least one candidate ciphertext, and a candidate ciphertext, the ciphertext check bit of which does not match a ciphertext check bit corresponding to order-preserving encryption, among the at least one candidate ciphertext, may be identified as a dummy ciphertext.

Figure 2:
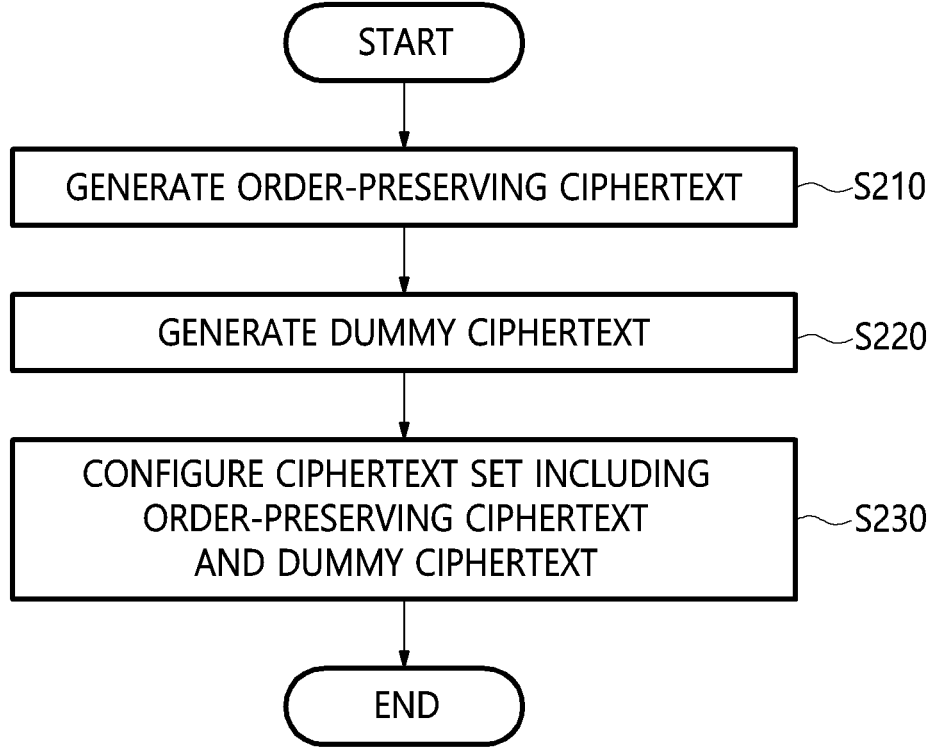
FIG. 2 is a flowchart illustrating a method for order-preserving encryption according to an embodiment of the present disclosure.

FIG. 2 is a flowchart illustrating a method for order-preserving encryption according to an embodiment of the present disclosure.

Referring to FIG. 2, in the method for order-preserving encryption according to an embodiment of the present disclosure, an order-preserving ciphertext is generated by performing order-preserving encryption on a plaintext at step S210.

For example, when F is defined as an order-preserving encryption function, a ciphertext acquired for a plaintext m and a secret key k may be F(k, m). Here, F may output an element in a ciphertext space C as the ciphertext by receiving an arbitrary element in a plaintext space M as input.

Also, in the method for order-preserving encryption according to an embodiment of the present disclosure, a plurality of dummy ciphertexts corresponding to a preset variable are generated for the order-preserving ciphertext at step S220.

Also, in the method for order-preserving encryption according to an embodiment of the present disclosure, the order-preserving ciphertext and the plurality of dummy ciphertexts are added to a ciphertext set at step S230.

Here, the ciphertext set includes a plurality of ciphertext subsets, and a state information variable indicating state information may be assigned to each of the plurality of ciphertext subsets.

Here, the initial value of the state information variable may be set to 0, and the value of the state information variable may be increased by 1 each time a ciphertext is added to the ciphertext subset to which the state information variable is assigned.

Here, an arbitrary ciphertext may be selected from the ciphertext subset, the state information variable of which has the smallest value, among the plurality of ciphertext subsets, a single dummy ciphertext may be generated by adding a ciphertext check bit generated in a manner different from order-preserving encryption to the arbitrary ciphertext, and the process of generating a single dummy ciphertext may be repeatedly performed a number of times corresponding to the preset variable.

Hereinafter, the process of adding a dummy ciphertext to a ciphertext set will be described in detail through an embodiment.

First, integers $\lambda$ and $\mu$ may be set as variables for enhancing security of order-preserving encryption technology according to the present disclosure.

Here, $\lambda$ and $\mu$ may be integers greater than 1. The ciphertext space C of an order-preserving encryption function F may be divided into u subspaces, $C_1, C_2, \ldots, C_\mu$. That is, $C_1, C_2, \ldots, C_\mu$ may correspond to a plurality of ciphertext subsets.

Subsequently, $N_1, N_2, \ldots, N_\mu$, which are state information variables, may be initialized to 0. Here, $N_i$ may indicate the number of ciphertexts included in a ciphertext subset $C_i$, among the ciphertext subsets. That is, the values of $N_1, N_2, \ldots, N_\mu$, which are the state information variables, may configure state information for order-preserving encryption.

Accordingly, when a plaintext m is given, encryption is performed using c=F (k, m), and the value of $N_i$ may be increased by 1 when $c \in C_i$ is satisfied.

Figure 3:
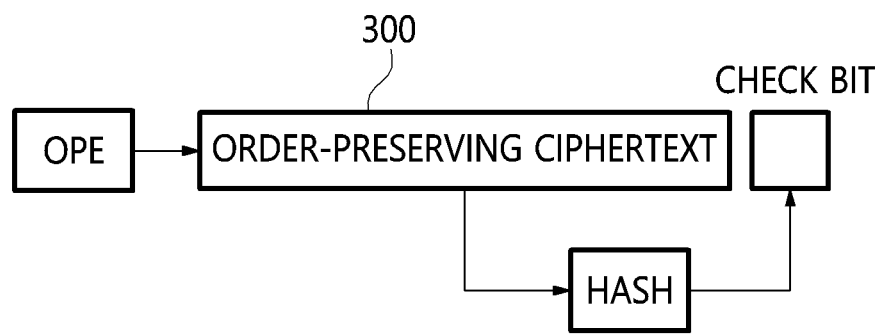
FIG. 3 and FIG. 4 are views illustrating an example of adding a ciphertext check bit to each of an order-preserving ciphertext and a dummy ciphertext according to the present disclosure.

Subsequently, a ciphertext check bit (1-bit) generated from the ciphertext c is added to an order-preserving ciphertext 300 through c'=c∥msb (H(c∥k)), as shown in FIG. 3, whereby a final ciphertext may be generated.

Subsequently, a number of dummy ciphertexts corresponding to the variable $\lambda$ may be generated.

Figure 4:
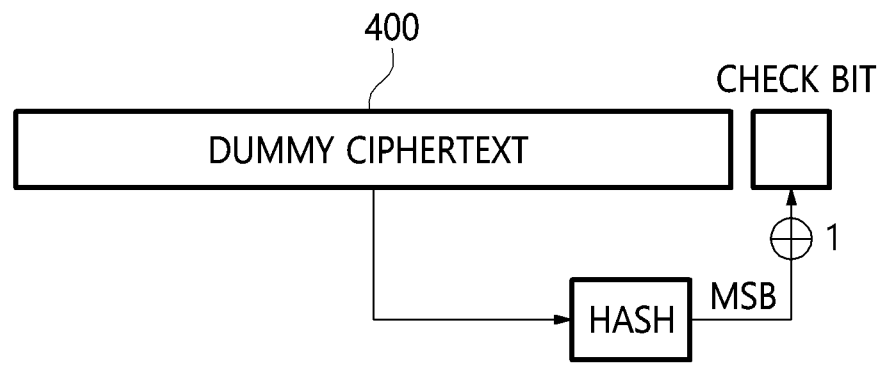

Here, $N_i$ having the smallest value is selected from among the state information variables $N_1, N_2, \ldots, N_\mu$, an arbitrary ciphertext x within the range of $C_i$ corresponding to $N_i$ is selected, and the value of $N_i$ may be increased by 1. Subsequently, as illustrated in FIG. 4, a ciphertext bit generated from the ciphertext x is added to the ciphertext x through x'=x∥msb(h(x∥k))+1, whereby a final dummy ciphertext x' may be generated.

Figure 5:
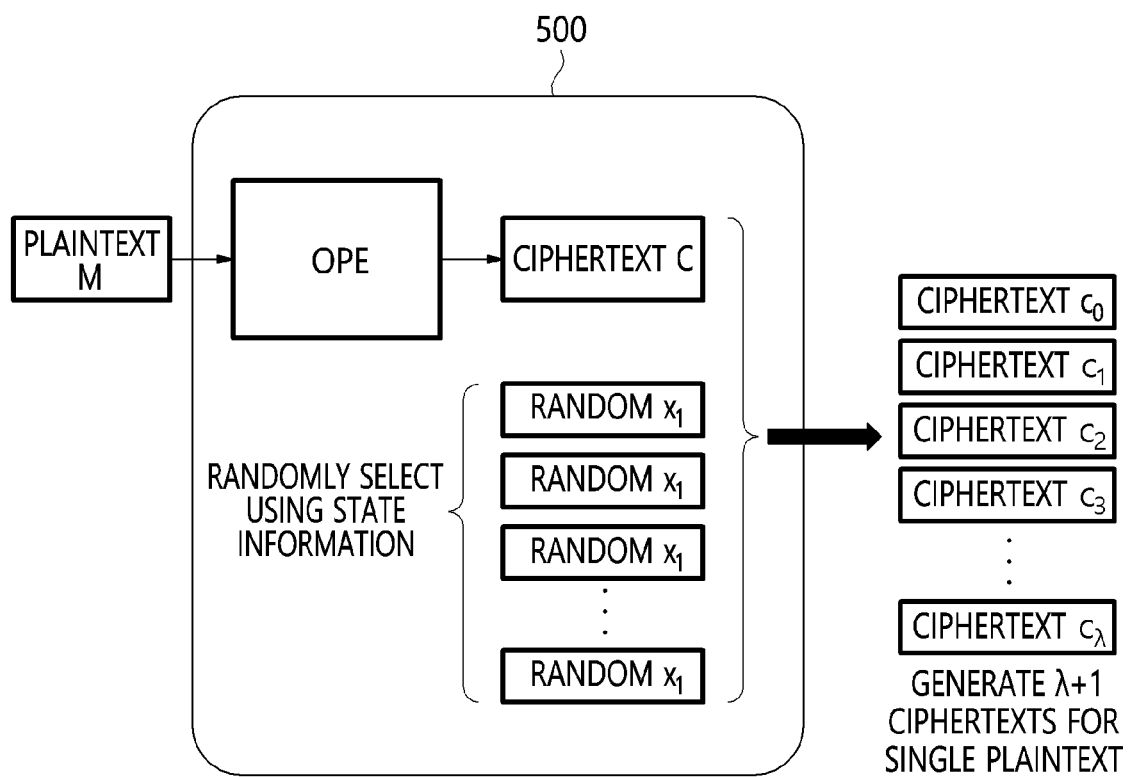
FIG. 5 is a view illustrating an example of a process of enhancing stateful order-preserving encryption according to the present disclosure.

When $\lambda$ dummy ciphertexts $x'_1, x'_2, \ldots, x'_\lambda$ are generated in this way, a single order-preserving ciphertext c and $\lambda$ dummy ciphertexts $x'_1, x'_2, \ldots, x'_\lambda$ may be generated through a plaintext m input to an order-preserving encryption apparatus 500, as illustrated in FIG. 5. That is, $\lambda$+1 ciphertexts, $c_0, c_1, \ldots, c_\lambda$, may be generated for a single plaintext, and the generated $\lambda$+1 ciphertexts, $c_0, c_1, \ldots, c_\lambda$, may be added to the ciphertext set.

Also, although not illustrated in FIG. 2, in the method for order-preserving encryption according to an embodiment of the present disclosure, a data search range is set based on a data search condition, at least one candidate ciphertext corresponding to the data search range is extracted from the plurality of ciphertext subsets, and search data is provided by removing a dummy ciphertext from the at least one candidate ciphertext.

Here, the data search range may be set based on values that are output by performing order-preserving encryption on the upper limit value and the lower limit value included in the data search condition.

Here, an encryption check bit is calculated for each of the at least one candidate ciphertext, and a candidate ciphertext, the ciphertext check bit of which does not match a ciphertext check bit corresponding to order-preserving encryption, among the at least one candidate ciphertext, may be identified as a dummy ciphertext.

Figure 6:
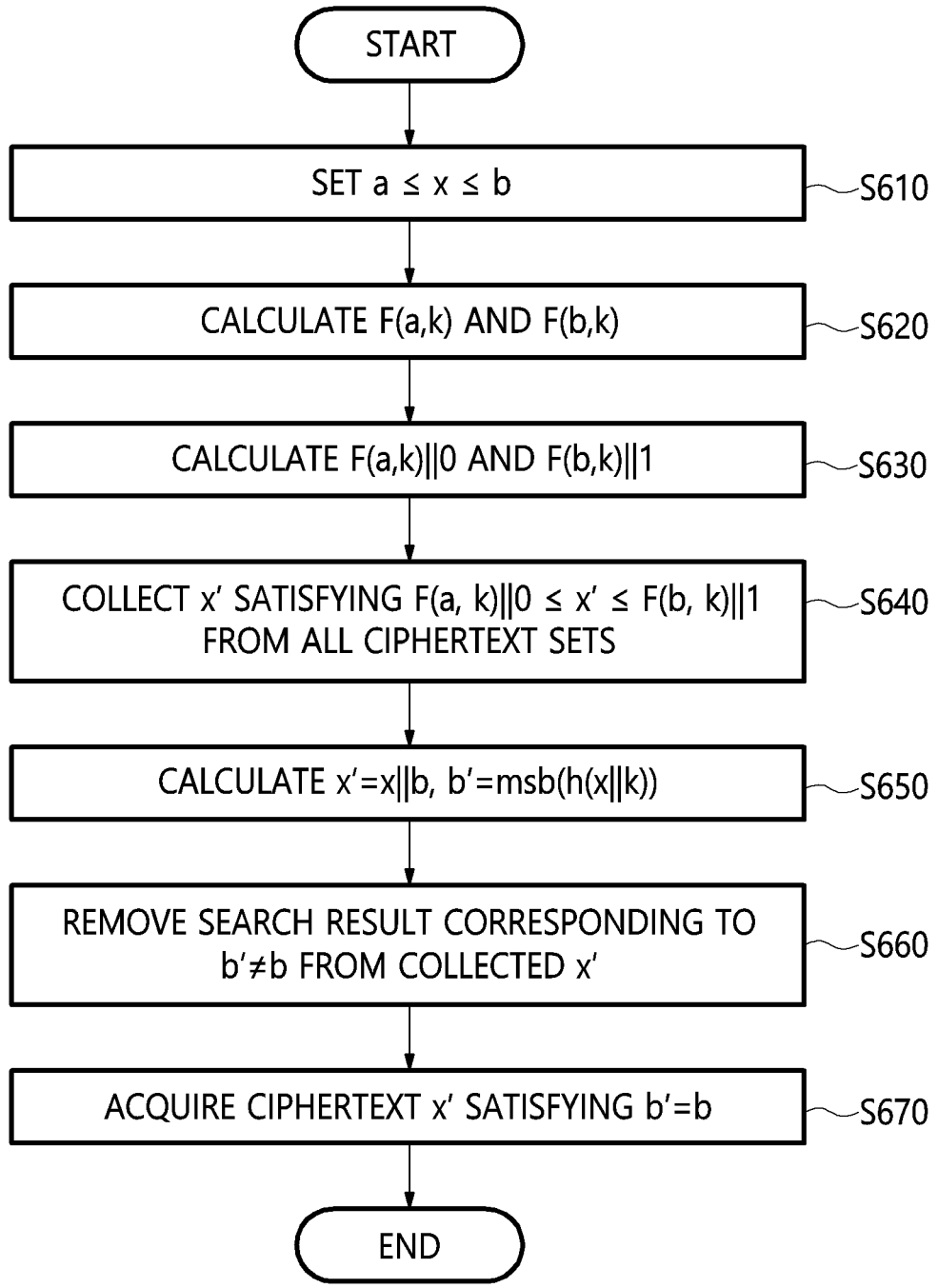
FIG. 6 is a flowchart illustrating a process of searching for data desired by a user according to an embodiment of the present disclosure.

Hereinafter, a process of searching for data desired by a user will be described in detail with reference to FIG. 6.

First, assuming that search data x satisfies a≤x≤b for a and b, which are specific pieces of data, a data search condition may be set to correspond to a≤x≤b at step S610.

Subsequently, F(a, k) and F(b, k) may be calculated for a and b, which are the lower limit value and the upper limit value included in the data search condition, in order to perform order-preserving encryption at step S620.

Subsequently, F(a, k)∥0 and F(b, k)∥1 are calculated in order to add a ciphertext check bit, whereby F(a, k)∥0≤x'≤F(b, k)∥1 corresponding to a data search range may be set at step S630.

Subsequently, at least one candidate ciphertext x' satisfying the data search range, F(a, k)∥0≤x'≤F(b, k)∥1, may be collected from a plurality of ciphertext subsets at step S640.

Subsequently, x'=x∥b, b'=msb(h(x∥k)) may be calculated in order to check the ciphertext check bit corresponding to order-preserving encryption for the at least one candidate ciphertext x' at step S650.

Subsequently, among the collected at least one candidate ciphertext x', a candidate ciphertext, the ciphertext check bit of which does not match a ciphertext check bit corresponding to order-preserving encryption (b b), may be removed from a search result at step S660.

Subsequently, the candidate ciphertext x', the ciphertext check bit of which matches the ciphertext check bit corresponding to order-preserving encryption (b'=b), may be provided as the search data at step S670.

According to the above-described configuration, λ dummy ciphertexts may be generated for a single plaintext m, and a user is able to determine statistical characteristics for a final ciphertext set based on state information of each of multiple ciphertext subsets. Therefore, an attacker may be prevented from inferring a plaintext set from the statistical characteristics of the ciphertext set.

Also, because an attacker is not able to distinguish between a ciphertext for an actual plaintext and an arbitrarily generated dummy ciphertext in a given ciphertext set even when the attacker infers a plaintext set, it is difficult to infer a plaintext for the actual ciphertext even though the order information of the ciphertext is used. By applying this technique, the security of the order-preserving technology may be enhanced, and this may be applied to any order-preserving encryption technology.

Through the above-described stateful order-preserving encryption method for enhancing security, an attacker is prevented from inferring a plaintext set from the statistical characteristics of a ciphertext set, whereby security may be enhanced.

Also, even when an attacker infers a plaintext set, the attacker is prevented from distinguishing between a ciphertext for an actual plaintext and an arbitrarily generated ciphertext in a ciphertext set, whereby the security of order-preserving encryption technology may be enhanced.

Figure 7:
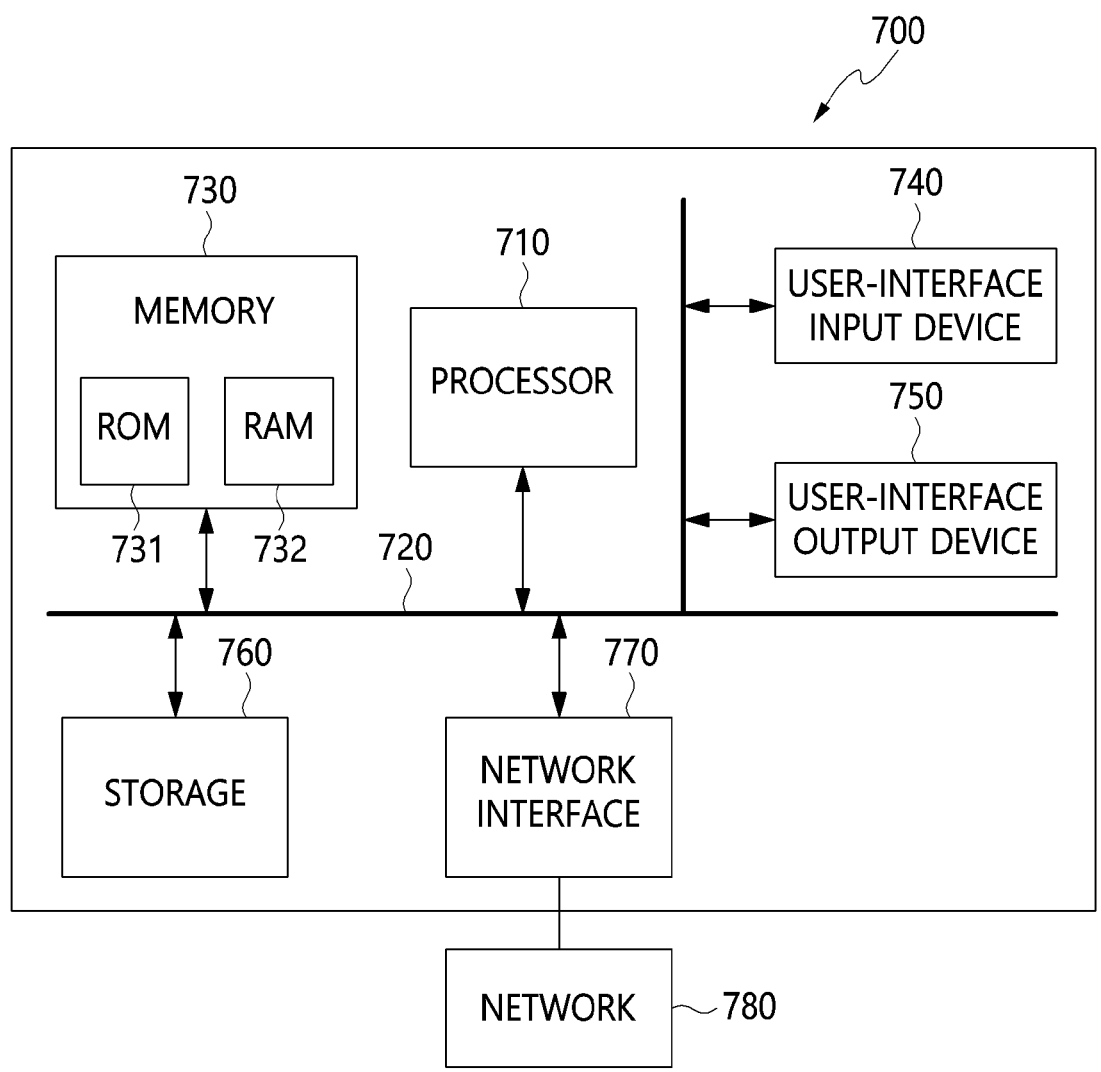
FIG. 7 is a view illustrating an apparatus for order-preserving encryption according to an embodiment of the present disclosure.

FIG. 7 is a view illustrating an apparatus for order-preserving encryption according to an embodiment of the present disclosure.

Referring to FIG. 7, the apparatus for order-preserving encryption according to an embodiment of the present disclosure may be implemented in a computer system including a computer-readable recording medium. As illustrated in FIG. 7, the computer system 700 may include one or more processors 710, memory 730, a user-interface input device 740, a user-interface output device 750, and storage 760, which communicate with each other via a bus 720. Also, the computer system 700 may further include a network interface 770 connected to a network 780. The processor 710 may be a central processing unit or a semiconductor device for executing processing instructions stored in the memory 730 or the storage 760. The memory 730 and the storage 760 may be any of various types of volatile or nonvolatile storage media. For example, the memory may include ROM 731 or RAM 732.

Accordingly, an embodiment of the present disclosure may be implemented as a non-transitory computer-readable medium in which methods implemented using a computer or instructions executable in a computer are recorded. When the computer-readable instructions are executed by a processor, the computer-readable instructions may perform a method according to at least one aspect of the present disclosure.

The processor 710 generates an order-preserving ciphertext by performing order-preserving encryption on a plaintext.

Also, the processor 710 generates a plurality of dummy ciphertexts corresponding to a preset variable for the order-preserving ciphertext.

Also, the processor 710 adds the order-preserving ciphertext and the plurality of dummy ciphertexts to a ciphertext set.

Here, the ciphertext set includes a plurality of ciphertext subsets, and a state information variable indicating state information may be assigned to each of the plurality of ciphertext subsets.

Here, the initial value of the state information variable may be set to 0, and the value of the state information variable may be increased by 1 each time a ciphertext is added to the ciphertext subset to which the state information variable is assigned.

Here, an arbitrary ciphertext may be selected from the ciphertext subset, the state information variable of which has the smallest value, among the plurality of ciphertext subsets, a single dummy ciphertext may be generated by adding a ciphertext check bit generated in a manner different from order-preserving encryption to the arbitrary ciphertext, and the process of generating a single dummy ciphertext may be repeatedly performed a number of times corresponding to the preset variable.

Also, the processor 710 sets a data search range based on a data search condition, extracts at least one candidate ciphertext corresponding to the data search range from the plurality of ciphertext subsets, and provides search data by removing a dummy ciphertext from the at least one candidate ciphertext.

Here, the data search range may be set based on values that are output by performing order-preserving encryption on the upper limit value and the lower limit value included in the data search condition.

Here, a ciphertext check bit is calculated for each of the at least one candidate ciphertext, and a candidate ciphertext, the ciphertext check bit of which does not match a ciphertext check bit corresponding to order-preserving encryption, among the at least one candidate ciphertext, may be identified as a dummy ciphertext.

The memory 730 stores the ciphertext set.

Also, the memory 730 stores various kinds of information generated in the apparatus for order-preserving encryption according to an embodiment of the present disclosure, as described above.

According to an embodiment, the memory 730 may separate from the apparatus for order-preserving encryption, and may support the function for order-preserving encryption. Here, the memory 730 may operate as separate mass storage, and may include a control function for performing operations.

Meanwhile, the apparatus for order-preserving encryption includes memory installed therein, whereby information may be stored therein. In an embodiment, the memory is a computer-readable medium. In an embodiment, the memory may be a volatile memory unit, and in another embodiment, the memory may be a nonvolatile memory unit. In an embodiment, the storage device is a computer-readable medium. In different embodiments, the storage device may include, for example, a hard-disk device, an optical disk device, or any other kind of mass storage device.

Through the above-described stateful order-preserving encryption apparatus for enhancing security, an attacker is prevented from inferring a plaintext set from statistical characteristics of a ciphertext set, whereby security may be enhanced.

Also, even when an attacker infers a plaintext set, the attacker is prevented from distinguishing between a ciphertext for an actual plaintext and an arbitrarily generated ciphertext in a ciphertext set, whereby security of order-preserving encryption technology may be enhanced.

According to the present disclosure, order-preserving encryption technology having enhanced security may be provided by preventing an attacker from inferring a plaintext set from the statistical characteristics of a ciphertext set.

Also, the present disclosure may enhance security of order-preserving encryption technology by making it impossible for an attacker to distinguish between a ciphertext for an actual plaintext and an arbitrarily generated ciphertext in a ciphertext set even when the attacker infers a plaintext set.

As described above, the stateful order-preserving encryption method and apparatus for enhancing security according to the present disclosure are not limitedly applied to the configurations and operations of the above-described embodiments, but all or some of the embodiments may be selectively combined and configured, so the embodiments may be modified in various ways.

What is claimed is:

1. A method for order-preserving encryption, comprising:
    generating an order-preserving ciphertext by performing order-preserving encryption on a plaintext;
    generating a plurality of dummy ciphertexts corresponding to a preset variable for the order-preserving ciphertext; and
    adding the order-preserving ciphertext and the plurality of dummy ciphertexts to a ciphertext set.

2. The method of claim 1, wherein the ciphertext set includes a plurality of ciphertext subsets, and a state information variable indicating state information is assigned to each of the plurality of ciphertext subsets.

3. The method of claim 2, wherein an initial value of the state information variable is set to 0, and a value of the state information variable is increased by 1 each time a ciphertext is added to the ciphertext subset to which the state information variable is assigned.

4. The method of claim 2, wherein generating the plurality of dummy ciphertexts includes
    selecting an arbitrary ciphertext from a ciphertext subset, the state information variable of which has a smallest value, among the plurality of ciphertext subsets;
    generating a single dummy ciphertext by adding a ciphertext check bit generated in a manner different from the order-preserving encryption to the arbitrary ciphertext; and
    repeatedly performing a process of generating the single dummy ciphertext a number of times corresponding to the preset variable.

5. The method of claim 2, further comprising:
    setting a data search range based on a data search condition;
    extracting at least one candidate ciphertext corresponding to the data search range from the plurality of ciphertext subsets; and
    providing search data by removing a dummy ciphertext from the at least one candidate ciphertext.

6. The method of claim 5, wherein the data search range is set based on values that are output by performing order-preserving encryption on an upper limit value and a lower limit value included in the data search condition.

7. The method of claim 6, wherein a ciphertext check bit is calculated for each of the at least one candidate ciphertext, and a candidate ciphertext, the ciphertext check bit of which does not match a ciphertext check bit corresponding to the order-preserving encryption, among the at least one candidate ciphertext, is identified as the dummy ciphertext.

8. An apparatus for order-preserving encryption, comprising:
    a processor for generating an order-preserving ciphertext by performing order-preserving encryption on a plaintext, generating a plurality of dummy ciphertexts corresponding to a preset variable for the order-preserving ciphertext, and adding the order-preserving ciphertext and the plurality of dummy ciphertexts to a ciphertext set; and
    memory for storing the ciphertext set.

9. The apparatus of claim 8, wherein the ciphertext set includes a plurality of ciphertext subsets, and a state information variable indicating state information is assigned to each of the plurality of ciphertext subsets.

10. The apparatus of claim 9, wherein an initial value of the state information variable is set to 0, and a value of the state information variable is increased by 1 each time a ciphertext is added to the ciphertext subset to which the state information variable is assigned.

11. The apparatus of claim 9, wherein the processor selects an arbitrary ciphertext from a ciphertext subset, the state information variable of which has a smallest value, among the plurality of ciphertext subsets, generates a single dummy ciphertext by adding a ciphertext check bit generated in a manner different from the order-preserving encryption to the arbitrary ciphertext, and repeatedly performs a process of generating the single dummy ciphertext a number of times corresponding to the preset variable.

12. The apparatus of claim 9, wherein the processor sets a data search range based on a data search condition, extracts at least one candidate ciphertext corresponding to the data search range from the plurality of ciphertext subsets, and provides search data by removing a dummy ciphertext from the at least one candidate ciphertext.

13. The apparatus of claim 12, wherein the data search range is set based on values that are output by performing order-preserving encryption on an upper limit value and a lower limit value included in the data search condition.

14. The apparatus of claim 13, wherein a ciphertext check bit is calculated for each of the at least one candidate ciphertext, and a candidate ciphertext, the ciphertext check bit of which does not match a ciphertext check bit corresponding to the order-preserving encryption, among the at least one candidate ciphertext, is identified as the dummy ciphertext.

* * * * *